United States Patent
Sueck et al.

(10) Patent No.: US 8,387,766 B2
(45) Date of Patent: Mar. 5, 2013

(54) WET-RUNNING CLUTCH ARRANGEMENT

(75) Inventors: Gregor Sueck, Sennfeld (DE); Jürgen Dacho, Bad Kissingen (DE); Thomas Adelmann, Retzstadt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 718 days.

(21) Appl. No.: 12/580,734

(22) Filed: Oct. 16, 2009

(65) Prior Publication Data

US 2010/0096231 A1    Apr. 22, 2010

(30) Foreign Application Priority Data

Oct. 16, 2008 (DE) .......................... 10 2008 042 884
Feb. 3, 2009 (DE) .......................... 10 2009 000 567

(51) Int. Cl.
*F16D 25/0638* (2006.01)
*F16H 45/02* (2006.01)

(52) U.S. Cl. .................... 192/85.46; 192/3.3; 192/85.24

(58) Field of Classification Search ................. 192/3.29, 192/3.3, 85.24, 85.45, 85.46
See application file for complete search history.

(56) References Cited

U.S. PATENT DOCUMENTS 6,264,018 B1 * 7/2001 Matsuoka et al. ........... 192/3.29
2008/0078638 A1 * 4/2008 Degler et al. .................. 192/3.3

FOREIGN PATENT DOCUMENTS

WO    WO 2007/124720    11/2007

* cited by examiner

*Primary Examiner* — Richard M. Lorence
(74) *Attorney, Agent, or Firm* — Cozen O'Connor

(57) ABSTRACT

A wet clutch arrangement, particularly a wet plate clutch or lockup clutch including a first friction face formation coupled with a housing arrangement for rotation around an axis of rotation and a second friction face formation coupled with an output member for rotation around the axis of rotation, and a preferably ring-shaped pressing piston. The pressing piston, together with the housing arrangement, defines a pressure fluid space and is movable in direction of the axis of rotation through a change in fluid pressure in the pressure fluid space for influencing the frictional interaction between the friction face formations. An operant fluid application surface of the pressing piston is in the range of 15000 mm$^2$ to 25000 mm$^2$ for generating a force acting upon the pressing piston.

10 Claims, 1 Drawing Sheet

WET-RUNNING CLUTCH ARRANGEMENT

BACKGROUND OF THE INVENTION

1. Field of the Invention

The present invention is directed to a wet clutch arrangement, particularly a wet plate clutch or lockup clutch, comprising a first friction face formation coupled with a housing arrangement for rotation around an axis of rotation and a second friction face formation coupled with an output member for rotation around the axis of rotation, and a preferably ring-shaped pressing piston, wherein the pressing piston and the housing arrangement define a pressure fluid space movable in direction of the axis of rotation through a change in fluid pressure in the pressure fluid space for influencing the frictional interaction between the friction face formations.

2. Description of the Related Art

WO 2007/124720 A1 discloses a hydrodynamic torque converter with a wet clutch arrangement acting as a lockup clutch. This can produce a torque transmission connection between a converter housing and a turbine hub. The wet clutch arrangement comprises, as a first friction face formation, a plurality of plates carried by an outer plate carrier at the converter housing so as to be fixed with respect to relative rotation. The second friction face formation likewise comprises a plurality of plates coupled to the turbine by an inner plate carrier and to the output member by a two-stage torsional vibration damper arrangement.

A ring-shaped pressing piston acts upon the plates in its radial outer area and presses these plates against one another to produce a state of engagement. Somewhat farther inward radially, the pressing piston is guided so as to be movable axially in a fluid-tight manner with respect to the outer plate carrier, which is fixedly supported at the converter housing. In its radial inner end area, the pressing piston is guided to be movable axially in a fluid-tight manner with respect to a ring-shaped hub element secured to the inner side of the converter housing. Accordingly, the pressing piston together with the converter housing defines a pressure fluid space. By supplying pressure fluid to this pressure fluid space, the pressure is increased and a force is generated that acts upon the piston in a direction of the friction face formations. The operant fluid application surface for generating an engaging force corresponds to an annular surface defined between the two radial outer and inner sealing locations of the pressing piston.

For a higher torque to be spontaneously transmitted in a drivetrain with a hydrodynamic torque converter of the type mentioned above, the lockup clutch must be engaged spontaneously, which requires a correspondingly spontaneous increase in the fluid pressure in the pressure fluid space. The existing flow resistance, the volume of the pressure fluid space that must be filled with pressure fluid, and the line resistance in the gearbox all impair the speed at which the lockup clutch is moved into the engaged state. For the driver, this results in unpleasantly noticeable delays in affecting the torque transmission.

SUMMARY OF THE INVENTION

It is an object of the present invention to provide a wet clutch arrangement by which an improved actuating behavior is achieved.

According to a first aspect of the present invention, a wet clutch arrangement, particularly a wet plate clutch or lockup clutch, comprising a first friction face formation coupled with a housing arrangement for rotation around an axis of rotation and a second friction face formation coupled with an output member for rotation around the axis of rotation, and a ring-shaped pressing piston, wherein the pressing piston, together with the housing arrangement, defines a pressure fluid space and is movable in direction of the axis of rotation through a change in fluid pressure in the pressure fluid space for influencing the frictional interaction between the friction face formations.

It is further provided according to one embodiment of the invention that an effectively operant fluid application surface of the pressing piston is in the range of 15000 $mm^2$ to 25000 $mm^2$ for generating a force acting upon the pressing piston.

In the present invention, by selecting the operant fluid application surface in the range indicated above, an optimal compromise can be achieved between the attainable pressing force and the response time of the clutch arrangement. The smaller the fluid application surface, the smaller the volume in the pressure fluid space and, therefore, also the smaller the amount of fluid that is required for achieving a determined axial movement of the pressing piston. A comparatively small fluid application surface means that the existing fluid pressure is converted into a force determined by the size of this surface area. A sufficiently large pressing force is generated with a sufficiently short response time by selecting the fluid application surface in the indicated range.

It can preferably be provided that the fluid application surface is less than 21000 $mm^2$.

According to another aspect of the invention, the following equations are applied in a generic wet clutch arrangement, possibly in combination with the features discussed above:

$$0.85 < D_R/D_A < 1.5,$$

where:

$D_R$ is the diameter of the pressing piston in its area acting upon the friction face formations; and $D_A$ is the outer diameter of the fluid application surface of the pressing piston.

The selection of the indicated ratio ensures that the friction face formations are acted upon in such radial area that permits the same to be configured with a comparatively large diameter and a comparatively large friction surface.

In this connection, the outer diameter of the fluid application surface substantially corresponds to the outer diameter of the pressing piston.

According to another aspect of the present invention, the following equation applies in a generic construction of a wet clutch arrangement, possibly in combination with the features discussed above:

$$0.1 < D_I/D_A < 0.8,$$

where:

$D_I$ is the inner diameter of the fluid application surface of the pressing piston; and $D_A$ is the outer diameter of the fluid application surface of the pressing piston.

Further, the inner diameter of the fluid application surface $D_I$ substantially corresponds to the inner diameter of the pressing piston and that the outer diameter of the fluid application surface substantially corresponds to the outer diameter of the pressing piston $D_A$.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
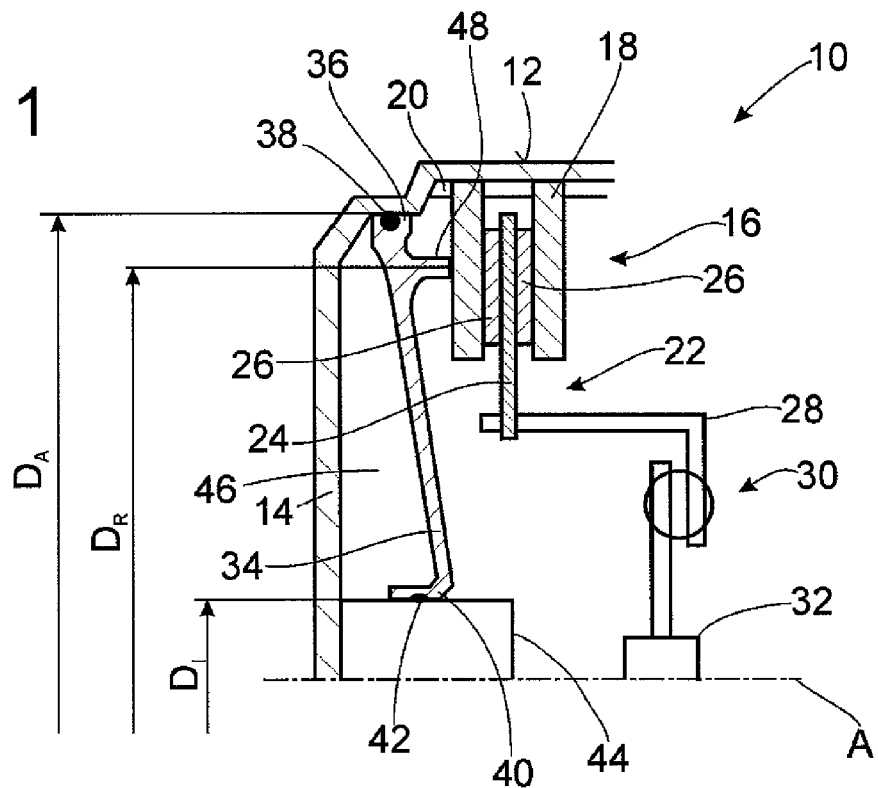
FIG. 1 is a partial longitudinal section through a wet clutch arrangement constructed according to one embodiment of the invention.

FIG. 1 shows a wet clutch arrangement 10 provided as a lockup clutch in a hydrodynamic torque converter or the like, but which can also be constructed as a wet plate clutch.

The clutch arrangement 10 comprises a housing arrangement 12 with two housing shells. Housing shell 14 is positioned on the engine side. When integrated in a hydrodynamic torque converter, a transmission-side housing shell forms an impeller. A first friction face formation 16 comprising two friction members 18, formed as plates coupled with the housing arrangement 12 for jointly rotating around an axis of rotation A. The housing arrangement 12 is preferably constructed with a tooth formation 20 with which the friction members 18 of the first friction face formation 16 engage in a rotational coupling.

A second friction face formation 22 comprises a friction member 24 with friction linings 26 on both axial sides. Friction member 24 is formed as a plate. The friction member 24 is coupled to an output hub 32, acting as output member, by a friction member carrier 28 and possibly by a torsional vibration damper arrangement 30 which is indicated schematically. In a hydrodynamic torque converter, a turbine can then be coupled in the torque flow in front of the torsional vibration damper arrangement, after the torsional vibration damper arrangement 30, or as part of a multiple-stage torsional vibration damper arrangement.

A ring-shaped pressing piston 34 is provided to bring the friction face formations 16, 22 into frictional interaction. In its radial outer end area 36, this pressing piston 34 is guided so as to be movable in direction of the axis of rotation A in a fluid-tight manner with respect to the housing arrangement 12 by a sealing element 38, which is preferably formed as an O-ring or the like. In its radial inner end area 40, the pressing piston 34 is guided so as to be movable in direction of the axis of rotation A in a fluid-tight manner, e.g., with respect to a hub element 44, or the like, which is secured to the housing arrangement 12 by a sealing element 42. Between the housing arrangement 12 and the pressing piston 34, there is a pressure fluid space 46 in which pressure fluid supplied through the hub 44 via a driven shaft or the like introduced and from which pressure fluid can also be removed. By increasing the fluid pressure in the pressure fluid space 46, a force is exerted on the pressing piston 34 accompanied by support at the housing arrangement 12, which force loads the pressing piston 34 in direction of the friction face formations 16, 22 to move the clutch arrangement 10 into an engaged state. In so doing, the pressing piston 34 presses against the friction face formations 16, 22, in this case, the first friction member 18 of the drive-side friction face formation 16, with an application area 48 which is constructed, e.g., annularly.

To achieve the fastest possible response time with the construction according to the invention, that is, to achieve, as quickly as possible, movement of the pressing piston 34, required for engagement, when the fluid pressure in the pressure fluid space 46 is increased, it is provided that an effectively operant fluid application surface of the pressing piston 34 for generating a force is in the range between 15000 mm$^2$ and 25000 mm$^2$, preferably less than 21000 mm$^2$. In the present instance embodiment, the effectively operant fluid application surface is that surface which, in projection on a plane orthogonal to the axis of rotation A, contributes to producing a corresponding conversion of the fluid pressure into a force axially loading the pressing piston 34. In the example shown in FIG. 1, this is the annular surface between the outer diameter $D_A$ and the inner diameter $D_I$, which diameters, in the present instance, define the corresponding diameter of the pressing piston 34 and the corresponding diameter of the fluid application surface.

Figure 2:
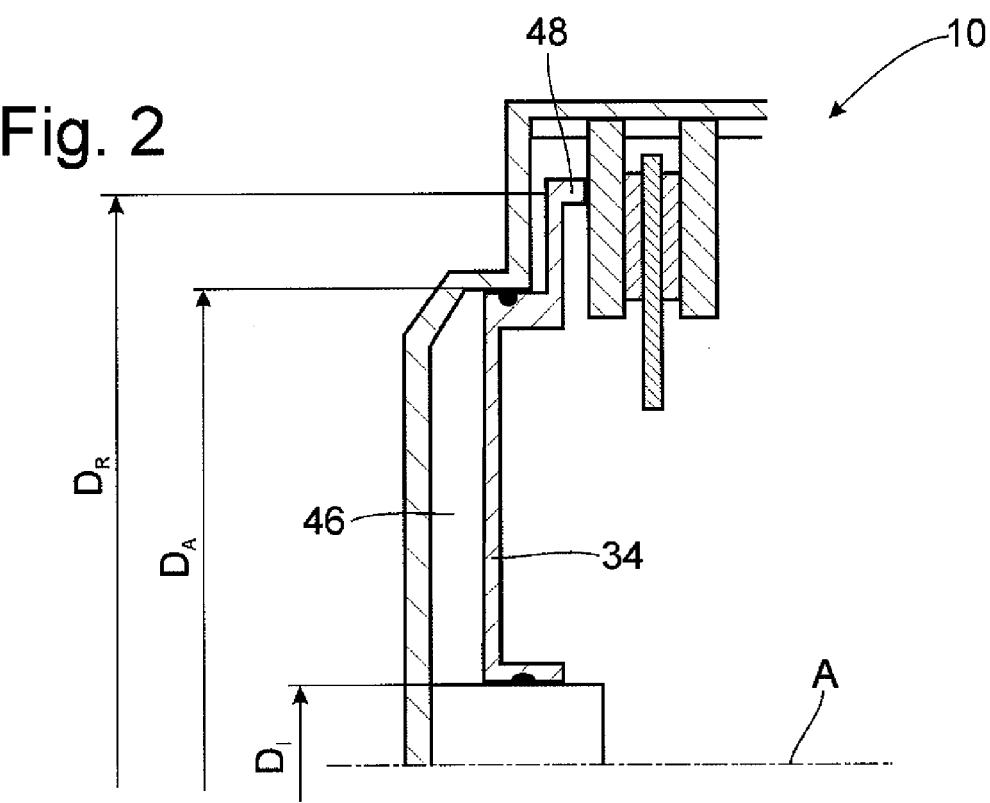
FIG. 2 is a view corresponding to FIG. 1 showing an alternative construction.

While the application area 48 of the pressing piston 34 lies on the radial inner side of the fluid-tight guide with respect to the housing arrangement 12 in the embodiment shown in FIG. 1, the application area 48 lies on the radial outer side of this guide in the embodiment form shown in FIG. 2. Accordingly, it can be seen that the outer diameter $D_A$ of the fluid application surface is smaller than the actual outer diameter of the pressing piston 34. Also, in this embodiment form a fast response of the clutch arrangement 10 is ensured in that the fluid application surface defined by the annular surface between the outer diameter $D_A$ and the inner diameter $D_I$, which is projected on a plane orthogonal to the axis of rotation A, is selected within the surface area range specified above with a sufficiently great pressing force through a comparatively small volume of the pressure fluid space 46.

Further, it has proven advantageous when the following equations apply for $D_A$, $D_I$, and $D_R$, where $D_R$ is the diameter, e.g., the mean diameter, of the application area 48:

$$0.85 < D_R/D_A < 1.5$$

and/or $$0.1 < D_I/D_A < 0.8.$$

Of course, the principles of the present invention, particularly with respect to the quantity ratios or dimensional specifications which can be provided individually and in combination, can be varied in many ways. For example, the friction face formations 16, 22 can, of course, be outfitted with a different quantity of friction members or plates. Also, the friction members of the drive-side friction face formation 16 can, of course, be coupled to the housing arrangement by a friction member carrier or the like rather than directly. The pressing piston 34 can be guided so as to be movable axially in a fluid-tight manner in its radial inner end area with respect to a component assembly other than the housing arrangement or a hub secured thereto. For example, a driven shaft could be guided in the axial area of the pressing piston 34 so that the pressing piston 34 could be guided so as to be axially movable on a shaft of this kind.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A wet clutch arrangement, comprising:
   a housing;
   a first friction face formation coupled to the housing for rotation around an axis of rotation;
   a second friction face formation coupled with an output member configured for rotation around the axis of rotation; and
   a pressing piston movable in a direction along the axis of rotation which, together with the housing, defines a pressure fluid space, wherein a change in fluid pressure in the pressure fluid space causes a frictional interaction between the first and the second friction face formations,
   wherein an operant fluid application surface of the pressing piston is in a range of about 15000 mm² to about 25000 mm² for generating a force acting upon the pressing piston, wherein:

$$0.85 < D_R/D_A < 1.5,$$

where:
   $D_R$ is a diameter of the pressing piston in an area configured to act upon the first and the second friction face formations that causes the frictional interaction between the first and the second friction face formations; and
   $D_A$ is an outer diameter of the fluid application surface of the pressing piston.

2. The wet clutch arrangement according to claim 1, wherein the operant fluid application surface is less than 21000 mm².

3. The wet clutch arrangement according to claim 1, wherein the outer diameter of the fluid application surface substantially corresponds to an outer diameter of the pressing piston.

4. The wet clutch arrangement according to claim 1, wherein the wet clutch is configured as a wet plate clutch or lockup clutch.

5. The wet clutch arrangement according to claim 1, wherein the pressing piston is ring-shaped.

6. The wet clutch arrangement according to one of claim 1, wherein:

$$0.1 < D_I/D_A < 0.8,$$

where:
   $D_I$ is an inner diameter of the fluid application surface of the pressing piston.

7. The wet clutch arrangement according to claim 6, wherein the inner diameter of the fluid application surface substantially corresponds to an inner diameter of the pressing piston.

8. A wet clutch arrangement, comprising:
   a housing;
   a first friction face formation coupled to the housing for rotation around an axis of rotation;
   a second friction face formation coupled with an output member configured for rotation around the axis of rotation; and
   a pressing piston movable in a direction along the axis of rotation which, together with the housing, defines a pressure fluid space, wherein a change in fluid pressure in the pressure fluid space causes a frictional interaction between the first and the second friction face formations,
   wherein an operant fluid application surface of the pressing piston is in a range of about 15000 mm² to about 25000 mm² for generating a force acting upon the pressing piston,
   wherein $$0.1 < D_I/D_A < 0.8,$$

where:
   $D_I$ is an inner diameter of the fluid application surface of the pressing piston; and
   $D_A$ is an outer diameter of the fluid application surface of the pressing piston.

9. The wet clutch arrangement according to claim 8, wherein the inner diameter of the fluid application surface substantially corresponds to an inner diameter of the pressing piston.

10. The wet clutch arrangement according to claim 8, wherein the outer diameter of the fluid application surface substantially corresponds to the outer diameter of the pressing piston.

* * * * *